United States Patent [19]

Miura et al.

[11] Patent Number: 4,994,007
[45] Date of Patent: Feb. 19, 1991

[54] COUNTER GEAR SUPPORTING DEVICE FOR AN AUTOMATIC TRANSMISSION

[75] Inventors: Masakatsu Miura, Kariya; Masahiko Ando, Okazaki, both of Japan

[73] Assignee: Aisin AW Co., Ltd., Anjo, Japan

[21] Appl. No.: 300,529

[22] Filed: Jan. 23, 1989

Related U.S. Application Data

[63] Continuation-in-part of Ser. No. 127,358, Dec. 1, 1987, Pat. No. 4,934,215.

[30] Foreign Application Priority Data

Dec. 9, 1986 [JP] Japan ................... 61-293663

[51] Int. Cl.⁵ .............................................. F16H 3/44
[52] U.S. Cl. .................................... 475/346; 475/283
[58] Field of Search ................. 74/740, 750 R; 475/8, 475/10, 219, 253, 348, 346, 282, 283

[56] References Cited

U.S. PATENT DOCUMENTS

| | | | |
|---|---|---|---|
| 2,403,594 | 7/1946 | Gilliard | 74/750 R X |
| 2,418,267 | 4/1947 | Lawler | 74/750 R X |
| 4,286,480 | 9/1981 | Dickie | 74/750 R X |
| 4,380,274 | 4/1983 | Abraham et al. | 475/346 X |
| 4,559,849 | 12/1985 | Ahlén et al. | 74/740 X |
| 4,574,658 | 3/1986 | Abbott et al. | 475/348 X |
| 4,914,979 | 4/1990 | Balmforth | 475/253 X |

Primary Examiner—Leslie A. Braun
Assistant Examiner—Benjamin Levi
Attorney, Agent, or Firm—Kanesaka and Takeuchi

[57] ABSTRACT

A counter gear section including its supporting device is constituted as a sub assembly. The sub assembly is formed by setting a bearing unit on the counter gear, and the assembly is inserted in the inner surface of a supporting wall of the case and is held and fixed by a brim and a snap ring. Further, splines are formed on a mating surface and an elongated section of an outer race. A one-way clutch is installed on the elongated section.

4 Claims, 4 Drawing Sheets

FIG. 3

| | | First Automatic Transmission Mechanism 1 | | | | | | | Second Automatic Transmission Mechanism 27 | | |
|---|---|---|---|---|---|---|---|---|---|---|---|
| | | C1 | C2 | B1 | B2 | B3 | F1 | F2 | C3 | B4 | F3 |
| P | | | | | | | | | | ○ | |
| R | | | ○ | | | ○ | | | | ○ | |
| N | | | | | | | | | | ○ | |
| D | 1 | ○ | | | | | | ○ | | ○ | ○ |
| D | 2 | ○ | | (○) | ○ | | ○ | | | ○ | ○ |
| D | 3 | ○ | | (○) | ○ | | ○ | | ○ | | |
| D | 4 | ○ | ○ | | ○ | | | | ○ | | |
| 3 | 1 | ○ | | | | | | ○ | | ○ | ○ |
| 3 | 2 | ○ | | ○ | ○ | | ○ | | | ○ | ○ |
| 3 | 3 | ○ | | ○ | ○ | | ○ | | ○ | | |
| 2 | 1 | ○ | | | | | | ○ | | ○ | ○ |
| 2 | 2 | ○ | | ○ | ○ | | ○ | | | ○ | ○ |
| 1 | 1 | ○ | | | | ○ | | ○ | | ○ | ○ |
| 1 | 2 | ○ | | ○ | ○ | | ○ | | | ○ | ○ | ns # COUNTER GEAR SUPPORTING DEVICE FOR AN AUTOMATIC TRANSMISSION

CROSS-REFERENCE TO RELATED APPLICATION

This is a continuation-in-part application of Ser. No. 127,358 field on Dec. 1, 1987, now U.S. Pat. No. 4,934,215.

BACKGROUND OF THE INVENTION

1. Field of the Invention

The present invention relates to an automatic transmission which is mounted on a vehicle, in particular a front-engine-front-drive type car, in detail relates to a counter gear supporting device which is situated in a middle portion of an automatic transmission.

2. Description of the Related Art

The applicant of the present invention has proposed, as shown in the Japanese Laid Open Pat. No. Sho-62-141345, an automatic transmission whose counter (drive) gear is situated coaxially with an input shaft near a center portion of the automatic transmission mechanism. With regard to the counter gear of the automatic transmission, one end of the counter gear is connected to a certain rotating element of a planetary gear unit, and another has a gear section, an outer surface of a boss section is supported by a supporting wall, through bearings, which is integrally constituted with the case.

The bearings are double tapered roller bearing, and its outer race has a brim section which bulges radially from a boss section, and a spline is formed at outer surface of the boss section, and a screw section is formed on another end of the outer race. A (second) one-way clutch is installed on an outer surface of the brim section. The spline formed on the boss section is coupled to the supporting wall, and a nut is set on the screw section, so that the nut and the brim hold the supporting wall.

Accordingly, to assemble the counter gear section, an engine side of a transaxle case is put downward, an outer race of a bearing is set on the case supporting wall. After turning over over the transaxle case, the outer race is fixed by fastening the nut. After this process, the counter, gear is installed with one of tapered bearing, further, after turning over the axle case again, another tapered bearing is installed. So the nut is set on the counter gear boss section so that certain pre-load is provided. Because of the above process, to assemble the counter gear section, the axle case are required to be turned many times. In addition, adjusting work such as fastening of the nut to fix the outer race, pre-load adjustment and caulking and the like have to be performed in the axle case, inevitably, such working process is laborious.

On the other hand, with regard to an automatic transmission for a front-engine-front-drive car, minimization of axial length is a critical issue when considering its mounting space. However, the above mentioned automatic transmission may cause problem on strength if the nut to hold the outer race toward the supporting wall is thin because the number of thread meshing with the nut is small. Consequently the nut needs certain thickness, which may increase an axial length.

SUMMARY OF THE INVENTION

The present invention is purposed to provide a counter gear supporting device wherein assembly is simplified and axial length is minimized by constituting a sub assembly comprising a counter gear section and its supporting device.

The present invention, taking the above mentioned situation into consideration, provides, for example, as shown in FIG.1 and FIG.2, a counter gear supporting device for an automatic transmission (A) including an automatic transmission mechanism (1) housed in a case (6) and having a planetary gear unit (2), an input shaft (3) connected to rotating elements (R1), (S1) of the planetary gear unit (2) at required moment through a clutch (C1) and a clutch (C2) respectively; a counter gear (5) connected to certain element (CR1) of the planetary gear unit (2); and a restraining means (B1), (B2), (B3), (F1), (F2) to restrain the rotating elements (R2), (S1) of the planetary gear unit (2) at required moment. The counter gear (5) is made up by a boss section (5a) and a gear section (5b), the counter gear (5) being placed coaxially with the input shaft (3), and placed in the axially mid part of the case (6). The boss section (5a) is free rotationally supported on a supporting wall (7) of the case (6) through a bearing unit (9). Under the above arrangement, the bearing unit (9) is constituted by inner races (10a), (10b) installed on the outer surface of the boss section (5a), rotating members (11a), (11b) and one outer race (12) which has a mating surface (12a) to fit with an inner surface of the case supporting wall (7), a brim section (12b) formed on one end of the mating surface (12a) and bulging radially outwardly from the mating surface (12a), an elongated section (12c) having as the same or small diameter as the mating surface (12a) and formed at another end of the mating surface (12a). A sub assembly (S) is constituted by an assembly of the boss section (5a) and the bearing unit (9) which is installed and supported on the boss section (5a) with applying certain pre-load so that sub assembly (S) holds the supporting wall (7) of the case (6) by the brim section (12b) and a stopping member (13) installed in the elongated section (12c).

As one example, the bearing unit (9) is a double tapered bearing.

Furthermore, the stopping member (13) is a tapered snap ring which is installed in a groove (a) constituted in the elongated section (12c) so that installing the tapered snap ring (13) generates certain stress state in the outer race (12) between the tapered snap ring (13) and the brim section (12b).

Splines (12a1), (12c1) are formed on the mating surface (12a) and an outer surface of the elongated section (12c). Wherein, the spline (12a1) formed on the mating surface is coupled to the case supporting wall (7) to stop rotation of the outer race (12) and a one-way clutch (F2) is installed on the outer surface of the elongated section (12c1) without causing rotation by the spline (12c1).

Based on the above structure, rotation which is shifted in the automatic transmission mechanism (1) at required moment is transmitted from a certain rotating element (for example, the carrier (CR1) to the counter (drive) gear (5), furthermore, transmitted to the front differential device (29).

To assemble the counter gear (5) to the case (6), at first, the inner races (10b), (10a) and the rotating members (11b), (11a) are installed on the counter gear boss section (5a) and the bearing unit (9) is set. And certain pre-load is provided to the bearing unit (9) by screwing thread and the like formed on the boss section (5a).

After that, the sub assembly (S) where the bearing unit (9) is installed on the counter gear (5) is inserted into the inner surface of the case supporting wall (7) from the elongated section (12c) side of the outer race (12). The brim section (12b) and one side of the case supporting wall (7) contact, then the stopping member (13) is installed in the elongated section (12c), thus the sub assembly (S) is installed.

Incidentally, the reference numerals in the parentheses are used only for reference with the drawings and do not define the invention. The same number may be named differently in the following description and in the previous description in which boarder concepts are adopted.

BRIEF DESCRIPTION OF THE DRAWINGS

FIG. 3 is a table of operation of the automatic transmission;

DETAILED DESCRIPTION OF THE PREFERRED EMBODIMENTS

The present invention will now be explained along with the drawings.

Figure 2:
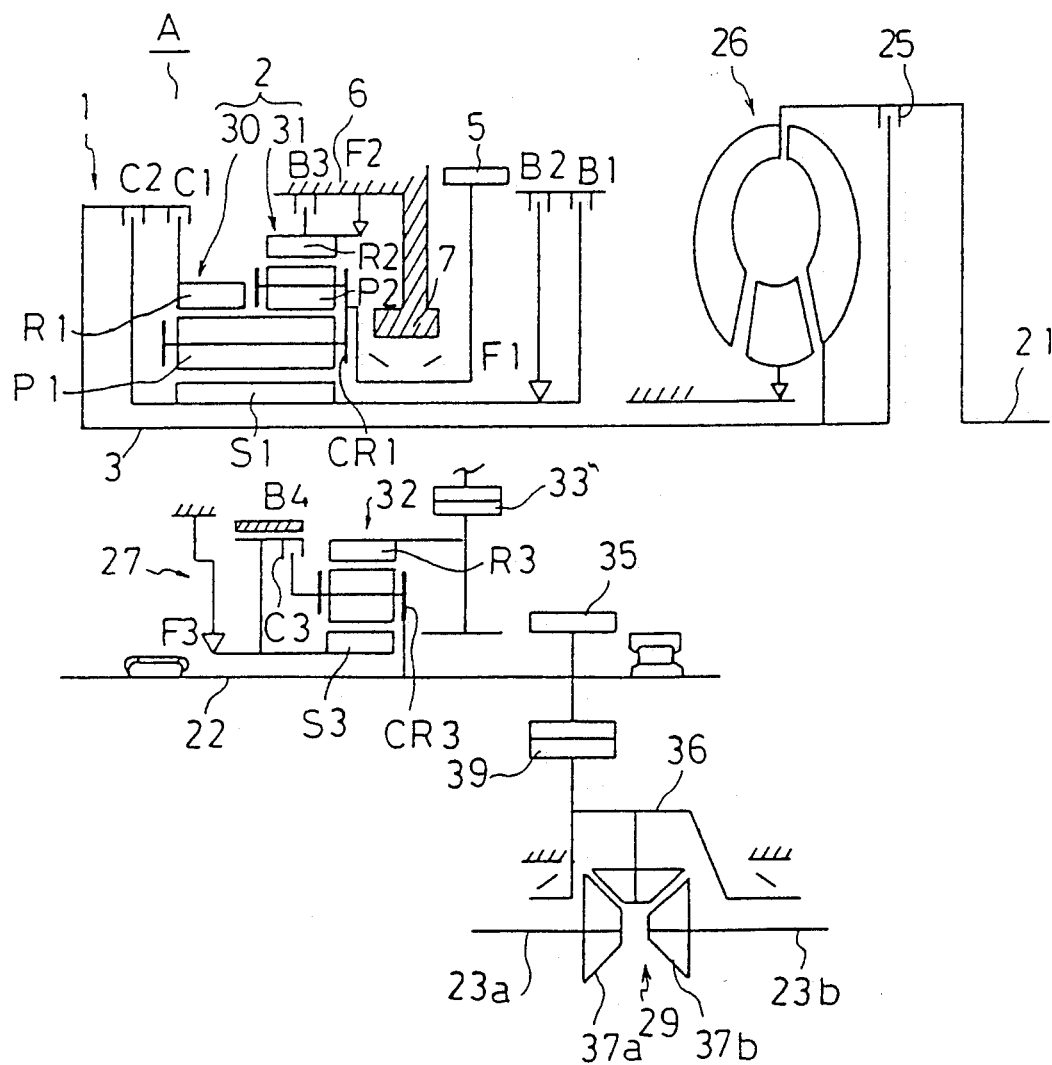
FIG. 2 is a schematic representation of an automatic transmission to which the present invention is applied.

The automatic transmission A, as shown in FIG.2, has three shafts: an input shaft 3 lined up along with an engine crank shaft 21, an outer shaft 22 and a front axle shaft formed of shafts 23a, 23b. On the input shaft 3, a torque converter 26 which has a lock-up clutch 25 and a first automatic transmission mechanism 1 are supported. On the counter shaft 22, a second automatic transmission mechanism 27 is supported and on the front axle shafts 23a and 23b, a front differential device 29 is supported.

The first automatic transmission mechanism 1 has a planetary gear unit 2 which is constituted by a single planetary gear 30 and a dual planetary gear 31. In this planetary gear unit 2 sun gears are commonly linked to form a common sun gear S1; and the carriers are commonly linked to form a common carrier CR1. The pinion meshing with the sun gear S1 is a long pinion P1. And the input shaft 3 and the ring gear R1 of the single planetary gear 30 connect together through the first (forward) clutch C1. The input shaft 3 and the sun gear S1 connect together through the second (reverse & direct) clutch C2. The input shaft 3 and the sun gear S1 connect together through the second (reverse & direct) clutch C2. The sun gear S1 is stopped directly by the first brake B1, and one way rotation of the sun gear S1 is stopped by the second brake B2 through the first one-way clutch F1. The ring gear R2 of the dual planetary gear 3 is stopped by the third brake B3 directly and stopped in one way rotation by the second one-way clutch F2. And a carrier CR1 is connected to the counter drive gear 5 supported by the case supporting wall 7. This gear 5 is an output member of the automatic transmission mechanism 1.

The second automatic transmission mechanism 27 has a single planetary gear 32 whose carrier CR3 and the sun gear S3 are connected through a third (direct) clutch C3. The sun gear S3 is stopped directly by the fourth (under drive) brake B4 and the one way rotation of the sun gear S3 is also stopped by the third one-way clutch F3. The ring gear R3 is connected to a counter driven gear 33 engaging with the counter drive gear 5, which is an input member of the automatic transmission mechanism 27. The carrier CR3 connects to the counter shaft 22. Furthermore, on the counter shaft 22, a reduction gear 35 which is an output member of the second automatic transmission mechanism 27 is fixed.

A front differential device 29 has a differential carrier 36 and a left and right side gears 37a and 37b. A ring gear 39 is fixed on a differential carrier 36 which is a gear mount case. And the ring gear 39 makes up a final reduction mechanism by meshing with the reduction gear 35. The left and right side gears 37a and 37b connect respectively to the left and right front axle shafts 23a and 23b.

The explanation of the operation of automatic transmission A will be shown along with FIG. 3.

The rotation of the engine crank shaft 21 is transmitted to the input shaft 3 through the torque converter 26 or through the lock-up clutch 25. At the first speed of D range, the first clutch C1 is engaged and the fourth brake B4 is actuated. At this state, in the first automatic transmission mechanism 1, the rotation of the input shaft 3 is transmitted to the ring gear R1 of the single planetary gear 30 through the first clutch C1. While, the rotation of the ring gear R2 of the dual planetary gear 31 is stopped by the second one-way clutch F2. So the forward rotation of the carrier CR1 is reduced sharply, while idling the sun gear S1 reversely, and the rotation is taken out from the counter drive gear 5. At the second automatic transmission mechanism 27, the sun gear S3 is stopped by the fourth brake B4 and the third one-way clutch F3. The rotation from the counter driven gear 33 is taken out from the ring gear R3 to the carrier CR3 as a reduced rotation. Therefore, the first speed of the first automatic transmission mechanism 1 and the reduced rotation of the second automatic transmission mechanism 27 are combined. The rotation made by this process is transmitted to the front differential device 29 through the reduction gear 35 and the ring gear 39 and then to the left and right front axle shafts 23a and 23b.

At the second speed of D range, the second brake B2 operates besides the engagement of the first clutch C1 and the operation of the fourth brake B4. Then the rotation of the sun gear S1 is stopped by the operation of the first one-way clutch F1 based on the brake B2. Therefore, the rotation from the input shaft 3 to the ring gear R1 reduces the rotation of the carrier CR1 in the forward direction and the rotation idles the ring gear R2 of the dual planetary gear 31 in the forward direction. The reduced rotation of the carrier CR1 is brought to the counter drive gear 5 as the second speed. Furthermore, the second automatic transmission 27 is kept at a reduced rotation state. The rotation made by the combination of the second speed of the automatic transmission mechanism 1 and the reduced rotation of the second automatic transmission mechanism 27 is transmitted to the front axle shafts 23a and 23b.

At the third speed of D range, the first automatic transmission mechanism 1 remains the second speed, the fourth brake B4 of the second automatic transmission mechanism 27 is released, and the third clutch C3 is engaged. Then the carrier CR3 and the sun gear S3 work together and the planetary gear 32 rotates so that the direct rotation is taken out to the counter shaft 22. At this state, the fourth brake B4 is released earlier than the engagement of the third clutch C3, so shifting is conducted under the condition that power transmission is secured by the operation of the third one-way clutch F3, which means the one-way clutch F3 prevents the power transmission from being unable to transmit. Therefore, the second speed rotation of the first automatic transmission 1 and the direct rotation of the second automatic transmission mechanism 27 are combined, so that the third speed mode is obtained in the automatic transmission A as a whole.

At the down shifting to the second and the third speed at D range, the first brake B1 also operates, then engine brake is actuated when coasting.

At the fourth speed mode at D range, the second clutch C2 is engaged after the third speed mode. Then the rotation is transmitted to the ring gear C1 from the input shaft 3 through the first clutch C1 and to the sun gear S1 through the second clutch C2. And the planetary gear unit 2 rotates wholly so that the direct rotation is transmitted to the counter drive gear 5. Then the direct rotation of the first automatic transmission mechanism 1 and the direct rotation of the second automatic transmission mechanism 27 are combined, while the counter drive gear 5 and the driven gear 33 are under certain accelerating condition, thus the over drive rotation is obtained in the automatic transmission A. In this process, when the first brake B1 operates at the second speed and the third speed, the first brake B1 is released earlier at the up shift to the fourth speed and the sun gear S1 is stopped by the first one-way clutch F1. The second clutch C2 is engaged, so the shift shock caused by the shifting can be prevented.

A third range is the same as the state when first brake B1 operates at the first and second speeds in the first, second and third speeds of the D range. A second range is the same as the state of the first and second speeds at the third range. Furthermore, at a first range, not only the first clutch C1 is engaged and the fourth brake B4 operates but also the third brake B3 operates. At this state, besides the stopping of the ring gear R2 by the second one-way clutch F2, the third brake B3 is actuated whichever the direction of the rotation may be and operates the engine brake. The second speed mode is as the same as the second speed mode of the second range.

At a reverse range, the second clutch C2 is engaged, while the third brake B3 and the fourth brake B4 operate. At this state, the rotation of the input shaft 3 is transmitted to the sun gear S1 through the second clutch C2. As the ring gear R2 of the dual planetary gear 31 is fixed by the operation of the third brake B3, the carrier CR1 rotates reversely by rotating the ring gear R1 of the single planetary gear 30 reversely. Then the reverse rotation is brought to the counter drive gear 5. Furthermore, the reverse rotation of the counter drive gear 5 is reduced by the second automatic transmission mechanism 27 and is transmitted to the transaxle shafts 23a and 23b.

Next, an explanation on an embodiment which materializes the above automatic transmission A is given.

The automatic transmission A has an integral casing made up by a transaxle case 6, a transaxle housing 41, a rear cover 4. In the integral casing, an input shaft 3, a counter shaft 22 and a ring gear mount case 36 forming the differential carrier of the front differential device 29 are all free rotationally supported. On the input shaft 3, a torque converter 26 having a lock-up clutch 25 and the first automatic transmission mechanism 1 are arranged, and on the counter shaft 22, the second automatic transmission mechanism 27 is arranged. A valve body 44 is arrange in the transaxle case 6.

In the first automatic transmission mechanism 1, a brake section 43, an output section 45, a planetary gear unit 2 and a clutch section 47 are arranged in order from the front side of the engine crank shaft to the back side. Between the brake section 43 and the torque converter 26, an oil pump 49 is arranged and a hollow shaft 50 enclosed by the input shaft 3 is free rotationally supported.

The planetary gear unit 2 made up of a single planetary gear 30 and a dual planetary gear 31 (refer to FIG. 2). The single planetary gear 30 is made up of a sun gear S1 arranged on the hollow shaft 50, a ring gear R1 and a carrier CR1 supporting a pinion P1 engaging with these gears. The dual planetary gear 31 is made up of the sun gear S1 arranged on the hollow shaft 50, a ring gear R2 and the carrier CR1 supporting a first pinion P1 engaging with the sun gear S1 and supporting a second pinion P2 engaging with the ring gear R2. These planetary gears 30 and 31 are composed of a common sun gear having a single gear which has the same number of gear teeth. The carrier CR1 is constituted integrally, and the pinion P1 is composed of a long pinion.

At the brake section 43, a first one-way clutch F1, a first brake B1 made of a multi-plates and a second brake B2 made of a multi-plate are arranged. Furthermore, a hydraulic actuator 51 is arranged adjacent to the first brake B1 and the hydraulic actuator 52 is arranged adjacent to the second brake B2. Both actuators 51 and 52 are fixed on the cover of an oil pump 49 and arranged in order to the diameter direction. Furthermore, the first brake B1 is connected to the hollow shaft 50. An inner race of the first one-way clutch F1 connects to the hollow shaft 50 and the outer race connects to the second brake B2.

Figure 1:
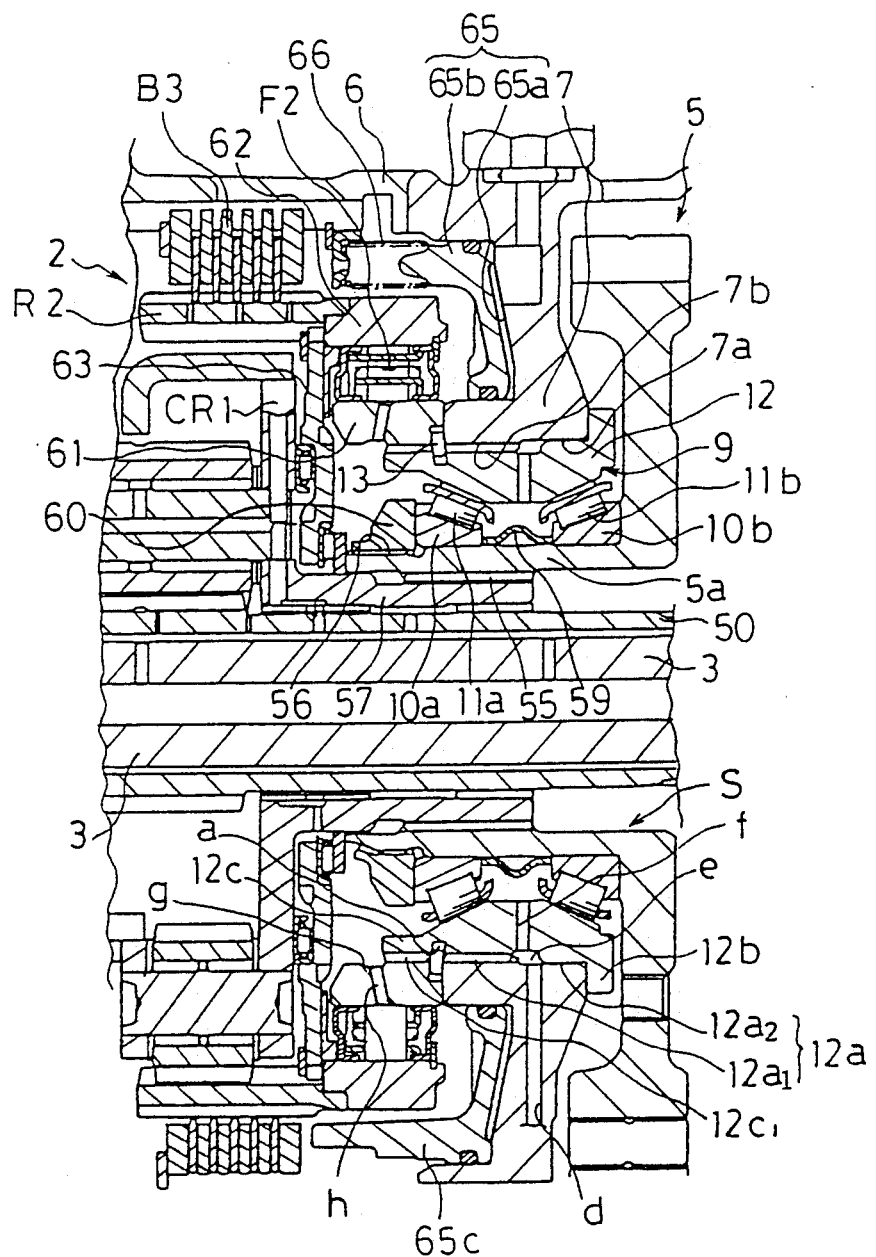
FIG. 1 is a cross sectional view of a counter gear supporting device of the present invention.

The output section 45 is placed in the middle of the first automatic transmission mechanism 1 and has the counter drive gear 5. The counter drive gear 5, as shown in FIG. 1, has a boss 5a with a certain length and a gear section 5b with a large diameter. A spline 55 is arranged on the inner surface of the boss 5a whose rear edge has a spline 56 with a certain length. The outer surface of the boss of the counter drive gear 5 is free rotationally supported by the supporting wall 7 arranged in the transaxle case 6 through the bearing unit 9. The boss 57 of the carrier CR1 is spline coupled with the boss spline 55. The bearing unit 9 comprises a double rows of inner races 10a and 10b, a double rows of tapered rollers 11a and 11b and a double tapered bearing having an outer race 12. On the outer surface of a counter gear boss 5a, a double rows of inner races 10a and 10b are situated, while a rigid spacer 59 is placed between the races 10a and 10b. A nut 60 is set on the spline 56 with a certain pre-load provided. An outer race 12 has a mating section 12a, situated inside the case supporting wall 7, a brim section 12b bulging radially outwardly at the front edge side of the mating section 12a and an elongated section 12c having a certain length at the back edge of the mating section. Furthermore, the mating section 12a is composed of a position section 12a2 and a spline section 12a1. On the elongated section 12c, a spline 12c1 elongated from the spline section 12a1 is arranged. At the elongated section 12c, a concaved groove 'a' whose back edge surface is made of a tapered surface is arranged. As a tapered snap ring 13 is arranged on the concaved groove, a case supporting wall 7a is held so that a certain tension force works on the outer race 12, or between the brim section 12b and the snap ring 13. In the outer race 12, the positioning section 12a2 is positioned to touch the position section 7a of the case supporting surface. The spline section 12a1 is engaged with the spline section 7b and the rotation is stopped. Furthermore, on the outer periphery of the elongated section 12c, an inner race 61 of the one-way clutch F2 is supported with spline. And on the case supporting wall 7 a lubrication oil hole 'd' is arranged. The lubrication oil from the hole 'd' is supplied to a space 'e' between the position section 12a2 at the outer race of the mating surface 12a and the spline section 12a1. And the lubrication oil is supplied from the space 'e' to the tapered rolles 11a and 11b through the oil hole f arranged in the outer race 12, and then to the splines 12a1 and 12c1. Inside the inner race 61 at the second one-way clutch F2 a circular concave 'g' is formed to be cut slightly inside the inner diameter. An oil hole 'h' is arranged to extend from the concave 'g' to a sprag of the one-way clutch. Therefore, oil which passed through the splines 12c1, 12a1 and the roller 11a is kept in the concave 'g' and supplied to the one-way clutch F2 through the oil hole 'h'.

The outer race 62 of the second one-way clutch F2 is fixed on the ring gear R2 of the dual planetary gear 31. The ring gear R2 is supported axially by a supporting plate 63 situated between the counter gear boss section 5a and the carrier CR1 through thrust bearings. Therefore, the second one-way clutch F2 is arranged axially and in parallel between the planetary gear unit 2 and the case supporting wall 7. Between the outer diameter of the ring gear R2 and the axle case 6, the third brake B3 is arranged. A cylinder 65a is arranged on one side surface of the supporting wall 7. In the cylinder 65a a hydraulic actuator 65 having a piston 65b is so arranged as to be enclosed by the second one-way clutch F2 and the case 6. Furthermore, the hydraulic actuator 65 has an arm 65c whose shape is like a tubular comb. This arm 65c is elongated to the axial direction passing over the second one-way clutch F2 and controls the third brake B3. A return spring 66 is arranged on the comb-shaped part of the arm 65c.

Figure 4:
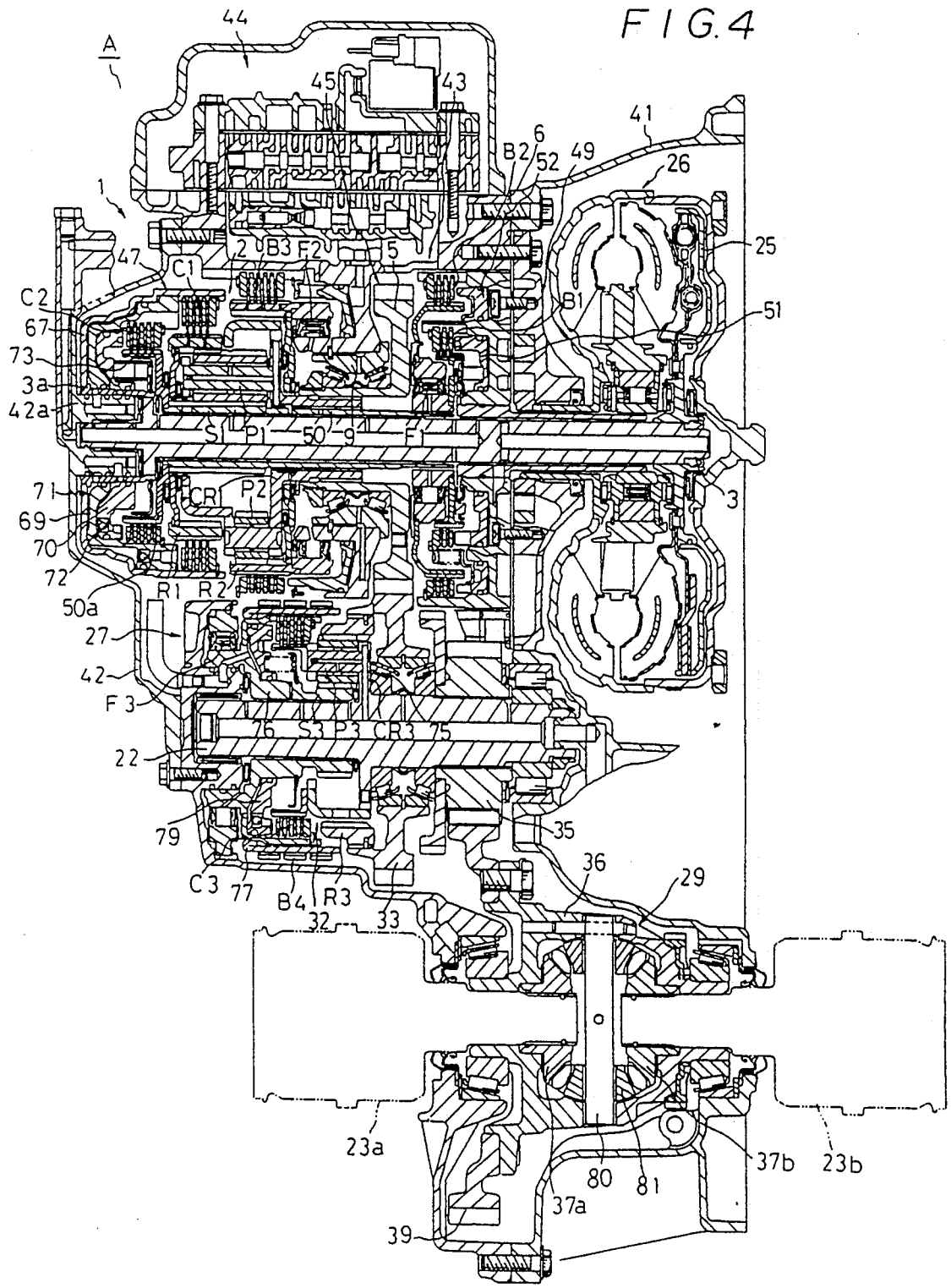
FIG. 4 is a cross sectional view of a whole automatic transmission.

The clutch section 47, as shown in FIG. 4, includes a first (forward) clutch C1 and a second (direct) clutch C2. This clutch section 47 is placed at the rear edge of the first automatic transmission mechanism 1 and housed in the rear cover section 42. The back edge of the input shaft 3 includes a sleeve 3a enclosing the boss 42a of the cover 42. A clutch drum 67 is connected to the sleeve 3a. Furthermore, in the clutch drum 67, a movable member 69 is situated to move freely in the axial direction by a spline. A piston member 70 is enclosed by the movable member 69. The movable member 69 and a cylinder made up by the inner side of the clutch drum 67 constitute an oil chamber, so that a hydraulic actuator 71 for the first clutch C1 is formed. While, the piston member 70 and a cylinder made up by the inner side of the movable member 69 constitute an oil chamber, so that a hydraulic actuator 72 for the second clutch C2 is formed. Furthermore, a spring 73 is set on between the piston member 70 and the snap ring fixed on the sleeve section 3a. The spring 73 composes a return spring for both piston members 69 and 70 of the hydraulic actuators 71 and 72. The first clutch C1 is arranged between a spline arranged on the inner surface of the outer portion of the clutch drum 67 and a spline arranged on the outer surface of the ring gear R1. The second clutch C2 is arranged between a spline arranged on the inner surface of the outer portion of a movable member 69 and a spline arranged on the outer portion of a hub 50a fixed on the hollow shaft 50.

While, the second automatic transmission mechanism 27 has a single planetary gear 32. Furthermore, a counter driven gear 33 is free rotationally supported through the bearing 75 and arranged on the counter shaft 22. A reduction gear 35 is fixed on the shaft 22. A ring gear R3 of the planetary gear 32 connects to the counter driven gear 33. The carrier CR3 supporting the pinion P3 is formed by bulging the counter shaft 22 radially. Furthermore, the sun gear S3 is arranged on the hub 76 which is free rotationally supported by the shaft 22. A fourth brake B4 composed of a band brake is engaged with the outer surface of a drum 77 fixed on the outer portion of the hub 76. Between the inner side of the drum 77 and the hub fixed on the carrier CR3, a third clutch C3 is placed. Furthermore, a piston is enclosed by the hub 76 close to the clutch C3, thus a hydraulic actuator 79 for the clutch C3 is formed. A third one-way clutch F3 is arranged between the elongated section of the hub 76 and the case 6.

The front differential device 29 has a ring gear mount case 36 which forms a differential carrier. This case 36 is free rotationally supported by a housing 41 and a case 6 through a bearing. Furthermore, on the mount case 36, a large diameter ring gear 39 engaging with the reduction gear 35 is fixed. Inside the ring gear 39, a pinion gear 81 is free rotationally supported by the pinion shaft 80, and left and right side gears 37a and 37b engaging with the gear 81 are free rotationally supported. Left and right front axle shafts 23a and 23b are enclosed and connected with the side gears 37a and 37b.

The structure of the automatic transmission A will be shown in detail. An inner race 10b is put in the boss 5a of the counter gear 5 together with a tapered roller 11b. Then rigid spacer 59 is put in and outer race 12 is installed. led. After putting the other inner race 10a together with a roller 11a, a nut 60 is put on a spline 56 to give a certain pre-load so that a sub assembly S for a bearing unit 9 arranged on the counter gear 5 is formed.

The assembly S is arranged inside the supporting wall 7 of the transaxle case 6 by inserting the outer race 12 from the front (engine) side. At this state, a positioning section 12a2 of the outer race 12 contacts a positioning section 7a of the case supporting surface and the bearing unit 9 is securely retained. And as a spline section 12a1 of the outer race 12 engages the spline 7b of the case supporting surface, the rotation of the race 12 is prevented. The tapered snap ring 13 is set in the concaved groove 'a' of the outer race 12 from back side of the transaxle case 6. Between a brim section 12b and a snap ring 13, the case supporting wall 7 is held to put the outer race 12 under certain stress condition without rattling, thus the sub assembly S is fixed on the case supporting 7.

A piston 65b of the hydraulic actuator 65 for the third brake B3 is arranged and the second one-way clutch F2 whose inner race 61 is spline-coupled with the elongated outer race 12c of the bearing unit 9 is arranged. At this state, a supporting plate 63 is also inserted and supports the ring gear R2 together with the second one-way clutch F2. After that, the boss 57 of the carrier CR1 supporting the pinions P1 and P2 is connected to the spline 55 of the counter drive gear boss 5a. Furthermore, the ring gear R2 is installed with its supporting plate 63, and the hollow shaft 50 is inserted, thus the planetary gear unit 2 is assembled.

The movable member 69, the piston member 70 and the return spring 73 are set in the clutch drum 67, and the second and the first clutches C1, C2 are also installed there, thus the clutch section 47 with the input shaft 3 is formed. The clutch section 47 is installed after the third brake B3 is installed.

On the other hand, the cover on which the hydraulic actuators 51, 52 are fixed is set on the body of the oil pump 49 to form the sub assembly. On the cover, the first one-way clutch F1, the hub of the second brake B2 and the hub of the first brake B1 are installed. The sub assembly is fixed on the case 6 by the bolts. Thus the first automatic transmission mechanism 1 is assembled.

While, the second automatic transmission mechanism 27, the counter driven gear 33 and the reduction gear 35 are installed on the counter shaft 22 to form the sub assembly, and the front differential device is assembled to form the sub assembly. And, the second automatic transmission mechanism 27, the first automatic transmission mechanism 1 and these sub assemblies are set in the cases in a manner that the transaxle housing 41 and the rear cover 42 are fixed on both junction surface of the transaxle case 6 so that the mechanisms 1, 27 and the sub assemblies are supported. After, the torque converter 26 is installed, thus, the automatic transmission A is assembled.

Incidentally, the above embodiment is explained for a four speeds automatic transmission which includes the first automatic transmission mechanism having forward three speeds and the second automatic transmission mechanism 27 having reduction speed state and direct driving state. However, the embodiment is also applicable, as shown in the Japanese Laid Open Pat. No. Sho-62-141345, for an automatic transmission which has the first automatic transmission mechanism attaining forward four speeds, and for other types of automatic transmission.

TECHNICAL ADVANTAGES OF THE INVENTION

As explained, the sub assembly (S) is formed by setting the bearing unit (9) on the counter gear (5), so that the adjustment of pre-load and fixing work are performed under the condition of the sub assembly (S). Then, no complicated assembly jig and facilities are required, and assembly work becomes easy. Further, the sub assembly (S) is inserted in the inner surface of the case supporting wall (7) and is fixed and supported by the brim (12b) and the stopping member (13), so that assembly work of the counter gear (5) to the case (6) becomes easy, assembly work performance is largely enhanced. And, no nuts and the like are required to fix the bearing unit (9) to the case supporting wall (7), so that axial length is shortened. As a result, a mounting ability to a vehicle as an automatic transmission (A) for a front-engine-front-drive type car is enhanced.

In particular, in the case that the bearing unit (9) has double tapered bearings, precise pre-load adjustment which in general, requires laborious work is easily conducted.

In the case that the stopping member (13) is a tapered snap ring, the outer race (12) is held and supported on the case supporting wall (7) without causing rattling, so that supporting of the bearing unit (9) is secured.

Furthermore, the spline (12a1) and (12c1) are formed on the mating surface (12a) and the elongated section (12c) respectively, and the one-way clutch (F2) is installed on the outer surface of the elongated surface (12c), so that the one-way clutch (F2) is securely set without rotation.

What is claimed is:

1. A counter drive gear supporting device for an automatic transmission, said automatic transmission including a casing, a planetary gear unit situated inside the casing and having an output element, comprising,
   an input shaft situated inside the casing and operationally connected to the planetary gear unit,
   a support wall formed in the casing to extend radially inwardly therefrom and having an inner surface,
   a sub assembly having a counter drive gear coaxially arranged with the input shaft and a bearing unit for rotationally supporting the counter drive gear,
   said counter drive gear having at one side a boss section connected to the output element of the planetary gear unit and at the other side a gear section adapted to be connected to an output device of the automatic transmission,
   said bearing unit rotationally supporting the boss section of the counter drive gear relative to the support wall, said bearing unit having a plurality of inner races situated over the boss section, bearing members situated outside the inner races and one outer race situated outside the bearing members, said outer race having a mating surface which fits flush with the inner surface of the support wall, a brim section formed at one side of the outer race to extend radially outwardly therefrom to engage the support wall, and an elongated section formed at the other side of the outer race, and
   stopping means installed on the outer race away from the brim section to extend between the support wall and the outer race, said stopping means and the brim section holding the support wall therebetween so that the bearing unit is installed on the boss section under a predetermined load between the bearing members.

2. A counter gear supporting device for an automatic transmission as defined in claim 1, wherein said bearing members are double tapered bearings.

3. A counter gear supporting device for an automatic transmission as defined in claim 1, wherein said fastening means is a tapered snap ring which is installed in a groove constituted in said elongated section so that said tapered snap ring causes certain stress in said outer race between said tapered snap ring and said brim section.

4. A counter drive gear supporting device for an automatic transmission as defined in claim 1, wherein said outer race includes a spline on the elongated section, said counter drive gear further including a one-way clutch with an inner race, said spline on the elongated section engaging the support wall to prevent rotation of the outer race and said spline on the elongated section engaging the inner race of the one-way clutch.

* * * * *